US012600106B2

(12) United States Patent
Sahin et al.

(10) Patent No.: US 12,600,106 B2
(45) Date of Patent: Apr. 14, 2026

(54) CORNET CONE PACKAGE PRODUCTION MACHINE WITH VERTICAL FEEDING

(71) Applicant: Mondi Kale Nobel Ambalaj Sanayi Ve Ticaret Anonim Sirketi, Bakirkoy (TR)

(72) Inventors: Umit Sahin, Luleburgaz (TR); Mehmet Ulas Ipek, Bakirkoy (TR)

( * ) Notice: Subject to any disclaimer, the term of this patent is extended or adjusted under 35 U.S.C. 154(b) by 14 days.

(21) Appl. No.: 18/850,386

(22) PCT Filed: Aug. 2, 2022

(86) PCT No.: PCT/TR2022/050808
§ 371 (c)(1),
(2) Date: Sep. 24, 2024

(87) PCT Pub. No.: WO2023/195941
PCT Pub. Date: Oct. 12, 2023

(65) Prior Publication Data
US 2025/0162273 A1 May 22, 2025

(30) Foreign Application Priority Data
Apr. 8, 2022 (TR) ................................ 2022/005633

(51) Int. Cl.
*B31B 50/28* (2017.01)
*B31B 50/04* (2017.01)
(Continued)

(52) U.S. Cl.
CPC ............ *B31B 50/28* (2017.08); *B31B 50/042* (2017.08); *B31B 50/062* (2017.08); *A23G 9/506* (2013.01); *B31B 2110/10* (2017.08)

(58) Field of Classification Search
CPC ..... B31B 50/28; B31B 50/062; B31B 50/024; B31B 2110/10; B31B 50/06; B31B 50/34; B31B 17/74; A23G 9/506; B31D 1/04; B31D 5/0086; B31F 1/00; B65D 3/06; B65B 35/50; B65B 61/22; B65B 35/54; B65B 35/56; B65B 61/20; B65B 42/28
(Continued)

(56) References Cited

U.S. PATENT DOCUMENTS

| 2,197,782 A | * | 4/1940 | Barbieri | ........................ 493/185 |
| 2,228,942 A | * | 1/1941 | Balton | ................... A23G 9/506 |
| | | | | 229/932 |

(Continued)

FOREIGN PATENT DOCUMENTS

| EP | 1864791 A1 | 12/2007 |
| JP | S59167405 A | 9/1984 |
| WO | 2021096452 A1 | 5/2021 |

OTHER PUBLICATIONS

International Search Report for corresponding PCT/TR2022/050808, dated Feb. 9, 2023.
(Continued)

*Primary Examiner* — Sameh Tawfik
(74) *Attorney, Agent, or Firm* — Egbert, McDaniel & Swartz, PLLC

(57) ABSTRACT

Disclosed is a production machine which is used in producing the cornet cone packages used in the packaging of cornet-type ice-creams and which provides for the cornet cone packages to be vertically fed and brought into a cone shape by being crimped.

8 Claims, 1 Drawing Sheet

(51) Int. Cl.
B31B 50/06 (2017.01)
*A23G 9/50* (2006.01)
*B31B 110/10* (2017.01)

(58) Field of Classification Search
USPC ......................................................... 493/154
See application file for complete search history.

(56) References Cited

U.S. PATENT DOCUMENTS

| | | | | |
|---|---|---|---|---|
| 2,303,420 A | * | 12/1942 | Amberg | A23G 9/288 |
| | | | | 53/445 |
| 2,612,016 A | | 9/1952 | Anderson | |
| 2,948,452 A | * | 8/1960 | Grogan | B65D 85/78 |
| | | | | 229/932 |
| 4,259,827 A | * | 4/1981 | Stohlquist | B65B 3/027 |
| | | | | 53/284 |
| 5,228,267 A | * | 7/1993 | Blankenship | B65D 85/78 |
| | | | | 53/142 |
| 5,379,569 A | * | 1/1995 | Mueller | B65B 5/106 |
| | | | | 53/157 |
| 7,549,273 B2 | * | 6/2009 | Dart | B65D 81/3874 |
| | | | | 53/463 |
| 7,614,993 B2 | * | 11/2009 | Van Handel | B29C 61/02 |
| | | | | 493/163 |
| 7,682,299 B2 | * | 3/2010 | Veciana Membrado | |
| | | | | B31B 70/00 |
| | | | | 229/87.08 |
| 11,786,084 B2 | * | 10/2023 | Abbosh | B31F 1/0009 |
| | | | | 493/423 |
| 2007/0068119 A1 | * | 3/2007 | Davi | B65B 25/007 |
| | | | | 53/266.1 |

OTHER PUBLICATIONS

Written Opinion of the International Searching Authority for corresponding PCT/TR2022/050808, dated Feb. 9, 2023.

* cited by examiner

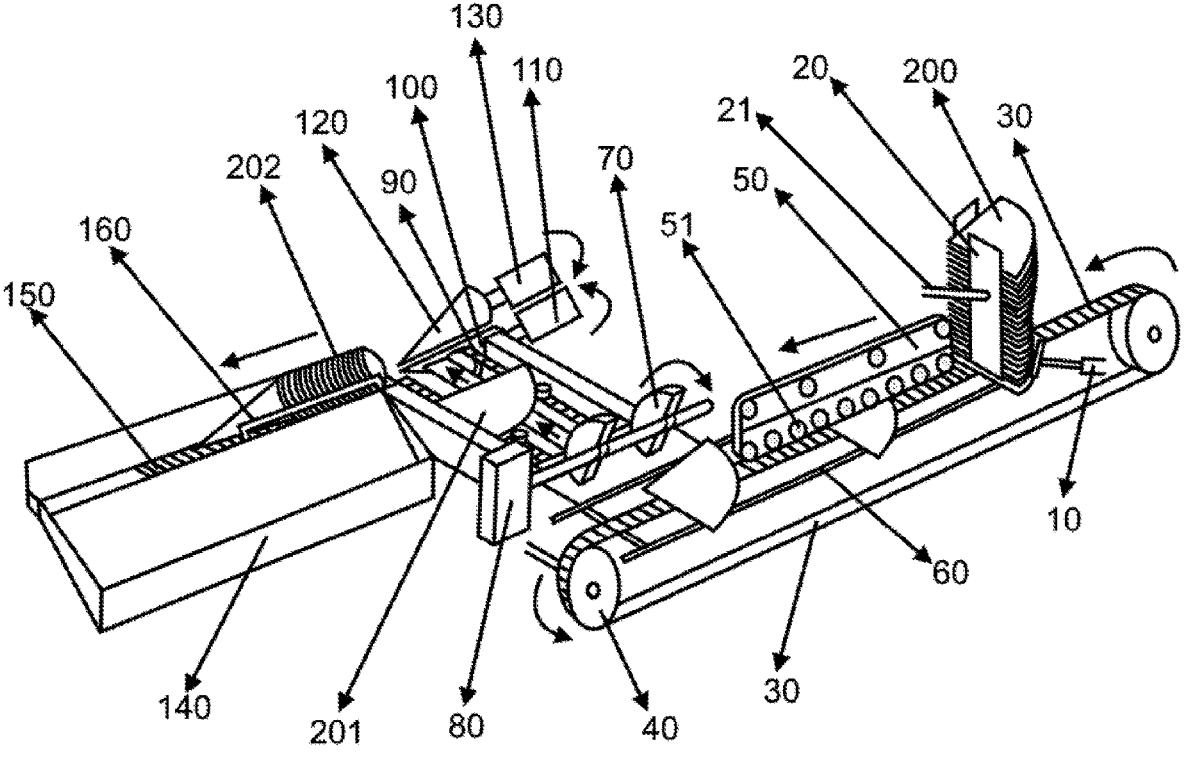

CORNET CONE PACKAGE PRODUCTION MACHINE WITH VERTICAL FEEDING

TECHNICAL FIELD

The invention is related to a cornet cone package production machine with vertical feeding used in the production of cornet cone packages used in the packaging of cornet-type ice-creams.

The invention is particularly related to a cornet cone package production machine with vertical feeding which provides for the cornet cone packages to be vertically fed and brought into a cone shape by being crimped.

PRIOR ART

Cornet-type ice-creams are among the top popular ice-creams frequently consumed. These ice-creams basically have conically shaped cornets filled with ice-creams having contents such as chocolate, toppings, fruits, nuts etc. Said cornets are sold by being placed in sleeve-like packages that cover the cornet part.

In the art, the standard cornet cone packages are cut into specific shapes before production and produced by being crimped into a conical shape in crimping machines. For this purpose, the cornet cone packages cut are stacked in order to be transferred to the crimping machines after the cutting process. The crimping machines shape the specifically shaped packages that are stacked into cones by crimping the same through rotation and form cone packages that are suitable for cornet cones. However, during the transmission of the specifically shaped packages to the crimping machine, problems such as deformation, tearing, and flying away are encountered and errors occur in production.

As a result of the research of the literature, document number EP1864791 can be given as an example of the known state of the art. Said document is related to the procedure for the production of conical ice-cream packages. In said invention, the production of the cornet cone packages after a four-step procedure has been mentioned. In the first stage the straight package bobbin is divided into specifically shaped stripes by means of a custom knife structure and having been divided into specific shapes the bobbin comes out of the machine in two ways as plane or reverse. In the second stage the reverse stripe is turned by a turning machine and readied for the cutting machine. In the third stage the bobbins prepared are transferred to the crimping machine by being subjected to a cutting procedure and in the fourth stage, the pieces coming out of the cutting machine are transformed into cone packages by crimping. In said invention, a method which produces cone packages with separate machines has been described. This requires multiple processes for various stages in the cone package production.

In consequence, the presence of the above-mentioned problems and inefficiency of the present solutions requires a development in the related technical field.

PURPOSE OF THE INVENTION

The present invention is related to a cornet cone package production machine with vertical feeding that eliminates the above-mentioned disadvantages and brings new advantages to the related technical field.

The main purpose of the invention is to present a production machine which provides that the cornet cone packages are vertically fed and brought to a cone shape by being crimped.

The purpose of the invention is to provide that the cornet cone packages are carried by being stacked on top of each other vertically and without getting caught or interlapped, crimped by being pushed in between two conical crimpers, and stacked within each other by being brought into a cone shape after the crimping.

Another purpose of the invention is to provide that the production is carried out without errors with the cornet cone packages that are stacked on top of each other vertically being transferred properly in between the crimpers.

Another purpose of the invention is to provide that the specifically shaped cornet cone packages are stacked over a single machine, transferred automatically to the crimping procedure, brought to a cone shape by being crimped and packages that are brought into a cone shape are stacked within each other.

In order to fulfill all the purposes that are mentioned above and that can be inferred from the detailed description; the invention is a production machine which is used in producing the cornet cone packages used in the packaging of cornet-type ice-creams and which provides for the cornet cone packages to be vertically fed and brought into a cone shape by being crimped, comprising a package fixing bottom set which stacks the cornet cone packages on top of each other, a first conveyor belt with linear motion which carries the cornet cone packages by pulling them individually on the lower surface of the package fixing bottom set, a semicircle disk in the form of a half circle which is located at the end of the first conveyor belt, and which has a rotational movement that holds and turns the cornet cone packages at certain intervals, a second conveyor belt which is positioned perpendicularly to the first conveyor belt, and which carries the cornet cone packages turned by the semicircle disk, lower conical crimper and upper conical crimper which are located at the end of the second conveyor belt, and which crimp the turned cornet cone packages and bring them into conical cone packages, having reverse rotational movements, cone stacking unit which stacks the conical cone packages produced by means of the lower conical crimper and upper conical crimper within each other, cone transmission belt which pulls the conical cone packages into the cone stacking unit from the lower conical crimper and upper conical crimper, and a cone holder which keeps the conical cone packages within each other on the cone transmission belt.

The structural and characteristic features and all the advantages of the invention will be understood more clearly thanks to the figures given below and the detailed description written by making references to these figures. Therefore, the evaluation should be made in consideration of these figures and the detailed description.

FIGURES AIDING THE DESCRIPTION OF THE INVENTION

FIG. 1: Representative view of the cornet cone package production machine of the invention.

DESCRIPTION OF THE REFERENCE PARTS

10. Package fixing bottom set
20. Package fixing side set
21. Side adjustment arm
30. First conveyor belt 40. Conveyor drive gear
50. Package upper transmission system
51. Disk
60. Package holder
70. Semicircle disk
80. Disk motor
90. Second conveyor belt
100. Lower conical crimper
110. Lower conical crimper motor
120. Upper conical crimper
130. Upper conical crimper motor
140. Cone stacking unit
150. Cone transmission belt
160. Cone holder
200. Cornet cone package
201. Turned cone package
202. Conical cone package

DETAILED DESCRIPTION OF THE INVENTION

In this detailed description the preferred alternatives of the production machine of the invention are described only for a better understanding of the subject and in the way to create no limiting effect whatsoever.

In FIG. 1, representational view of the production machine of the invention has been given. Accordingly the production machine basically comprises a package fixing bottom set (10) which stacks the cornet cone packages (200) on top of each other, package fixing side set (20) which holds the cornet cone packages (200) on the package fixing bottom set (10) from their side surfaces, a first conveyor belt (30) with linear motion which carries the cornet cone packages (200) by pulling them individually on the lower surface of the package fixing bottom set (10), conveyor drive gear (40) which has the rotational movement that moves the first conveyor belt (30) linearly, a package transmission upper system (50) which advances the cornet cone packages (200) on the first conveyor belt (30), package holder (60) which supports the cornet cone packages (200) from under the first conveyor belt (30), a semicircle disk (70) which holds the cornet cone packages (200) and turns the same at the end of the first conveyor belt (30), disk motor (80) rotating the semicircle disk (70), a second conveyor belt (90) which carries the cornet cone packages (201) turned by the semicircle disk (70), lower conical crimper (100) and upper conical crimper (120) which are located at the end of the second conveyor belt (90) and which crimp the turned cornet cone packages (201) and bring them into conical cone packages (202), having reverse rotational movements, cone stacking unit (140) which stacks the conical cone packages (202) within each other, cone transmission belt (150) which pulls the conical cone packages (202) into the cone stacking unit (140) from the lower conical crimper (100) and upper conical crimper (120), and a cone holder (160) which keeps the conical cone packages (202) within each other on the cone transmission belt (150).

In the production machine of the invention the specifically shaped cornet cone packages (200) are stacked on top of each other on the package fixing bottom set (10) in order to bring them into cone form. Cornet cone packages (200) stacked on top of each other on the package fixing bottom set (10) are held by means of package fixing side set (20) from their side surfaces. The package fixing side set (20) has the side adjustment arm (21) which provides for the width adjustment.

There is a first conveyor belt (30) with linear motion which carries the cornet cone packages (200) by pulling them individually on the lower surface of the package fixing bottom set (10). Said first conveyor belt (30) moves linearly by means of the conveyor drive gear (40) which is located at both ends and which makes a rotational movement.

A package transmission upper system (50) is connected on the first conveyor belt (30) which advances the cornet cone packages (200) on the first conveyor belt (30). Said package transmission upper system (50) has free-rotating disks (51). The disks (51) rotate freely on the first conveyor belt (30) and provide that the cornet cone packages (200) are advanced on the first conveyor belt (30). There is at least one package holder (60) under the first conveyor belt (30) as well. The package holder (60) supports the cornet cone packages (200) from under the first conveyor belt (30). Thereby the cornet cone packages (200) are carried on the first conveyor belt (30) such that they are between the package transmission upper system (50) and the package holder (60).

At the end of the first conveyor belt (30), there is at least one semicircle disk (70) which holds and turns the cornet cone packages (200). Said semicircle disk (70) makes a rotational movement by means of the disk motor (80). The semicircle disk (70) forms the desired gaps between the cornet cone packages (200) that are transferred from the first conveyor belt (30) by contacting the cornet cone packages (200) at certain time intervals as per its semicircle shape and the cornet cone packages (201) turned in this manner are transferred to the lower conical crimper (100) and upper conical crimper (120) without interlapping and disrupting the operation of the production machine.

The cornet cone packages (201) turned with the semicircle disk (70) are carried on the second conveyor belt (90) which has been positioned perpendicularly to the first conveyor belt (30). The semicircle disk (70) pulls the cornet cone packages (200) that are transferred from the first conveyor belt (30) from the sides by contacting them at certain intervals and drops the turned cornet cone packages (201) to the second conveyor belt (90).

At the end of the second conveyor belt (90), there is a lower conical crimper (100) and upper conical crimper (120) which crimp the turned cornet cone packages (201) and bring them into conical cone packages (202). Said lower conical crimper (100) and upper conical crimper (120) make reverse rotational movements from each other by means of the lower conical crimper motor (110) and the upper conical crimper motor (130), respectively. At the same time, the lower conical crimper (100) presses the turned cornet cone packages (201) that come between the lower conical crimper (100) and upper conical crimper (120) at certain intervals and when the cornet cone package (201) is brought to a conical cone package (202) by being crimped move in a downward direction.

At the end of the second conveyor belt (90) there is a cone stacking unit (140) which provides that the conical cone packages (202) are stacked within each other. Said cone stacking unit (140) has a cone transmission belt (150) that pulls the conical cone packages (202) from the lower conical crimper (100) and upper conical crimper (120) into the cone stacking unit (140). The conical cone packages (202) are held within each other on the cone transmission belt (150) by means of the cone holder (160).

The conical cone packages (202) produced by means of the lower conical crimper (100) and the upper conical crimper (120) are pulled by means of the cone transmission belt (150) and held on the cone holder (160). The conical cone packages (202) fall into the cone stacking unit (140) as stacked within each other at the desired amount after passing the cone holder (160) length. Depending on the size length of the cone holder (160) the number of the conical cone packages (202) desired to be stacked within each other can be adjusted.

The Working Principle of the Production Machine According to the Invention is as Follows;

The specifically shaped cornet cone packages (200) are stacked on top of each other on the package fixing bottom set (10) and advanced on the first conveyor belt (30) by means of the package transmission upper system (50) and package holder (60).

The cornet cone packages (200) arriving at the end of the first conveyor belt (30) are turned on the second conveyor belt (90) at certain intervals by means of the semicircle disk (70) which makes a rotational movement.

The turned cornet cone packages (201) are brought to a conical cone package (202) by being crimped by means of the lower conical crimper (100) and upper conical crimper (120) which make reverse rotational movements from each other located at the end of the second conveyor belt (90).

The conical cone packages (202) are pulled from the lower conical crimper (100) and upper conical crimper (120) by means of the cone transmission belt (150) and held within each other on the cone holder (160). The conical cone packages (202) fall into the cone stacking unit (140) as stacked within each other at the desired amount after passing the cone holder (160) length.

The invention claimed is:

1. A machine for producing cornet cone packages used in ice-cream packaging, the machine comprising:

a package fixing bottom set adapted to allow a stacking of the cornet cone packages on top of each other thereon;

a first conveyor belt having a linear motion and cooperative with said package fixing bottom set to pull the cornet cone packages individually from a surface of said package fixing bottom set and to carry the cornet cone packages therefrom;

a semicircle disk positioned at an end of said first conveyor belt, said semicircle disk having a rotational movement to change a direction of the cornet cone package from said first conveyor belt;

a second conveyor belt positioned in perpendicular relationship to said first conveyor belt to carry the cornet cone packages whose direction is changed by said semicircular disk;

a lower conical crimper positioned at an end of said second conveyor belt;

an upper conical crimper positioned at the end of said second conveyor belt, said lower conical crimper and said upper conical crimper adapted to crimp the cornet cone package into a conical shape;

a cone stacking unit downstream of said lower conical crimper and said upper conical crimper to stack the cornet cone packages within one another;

a cone transmission belt positioned between said lower and upper conical crimpers and said cone stacking unit to pull the cornet cone packages from said lower and upper conical crimpers into said cone stacking unit; and a cone holder cooperative with said cone transmission belt to keep the cornet cone packages within each other on said cone transmission belt.

2. The machine of claim 1, further comprising:

a package fixing side set positioned adjacent said package fixing bottom set to hold the cornet cone packages on said package fixing bottom set from side surfaces thereof.

3. The machine of claim 1, further comprising:

a side adjustment arm cooperative with said package fixing bottom set to adjust a width of said package fixing bottom set.

4. The machine of claim 1, further comprising:

a package transmission upper system connected to said first conveyor belt, said package transmission upper system having freely rotating disks adapted to advance the cornet cone package on said first conveyor belt.

5. The machine of claim 1, further comprising:

a package holder positioned below said first conveyor belt to support the cornet cone package therefrom.

6. The machine of claim 1, further comprising:

a disk motor connected to said semicircle disk to drive a rotational movement of said semicircle disk.

7. The machine of claim 1, further comprising:

a lower conical crimper motor connected to said lower conical crimper to drive said lower conical crimper in rotation.

8. The machine of claim 1, further comprising:

an upper conical crimper motor connected to said upper conical crimper to drive said upper conical crimper in rotation.

* * * * *